Nov. 1, 1960  W. H. MEATS  2,958,558
GOODS VEHICLE BODIES
Filed June 4, 1959  2 Sheets-Sheet 1
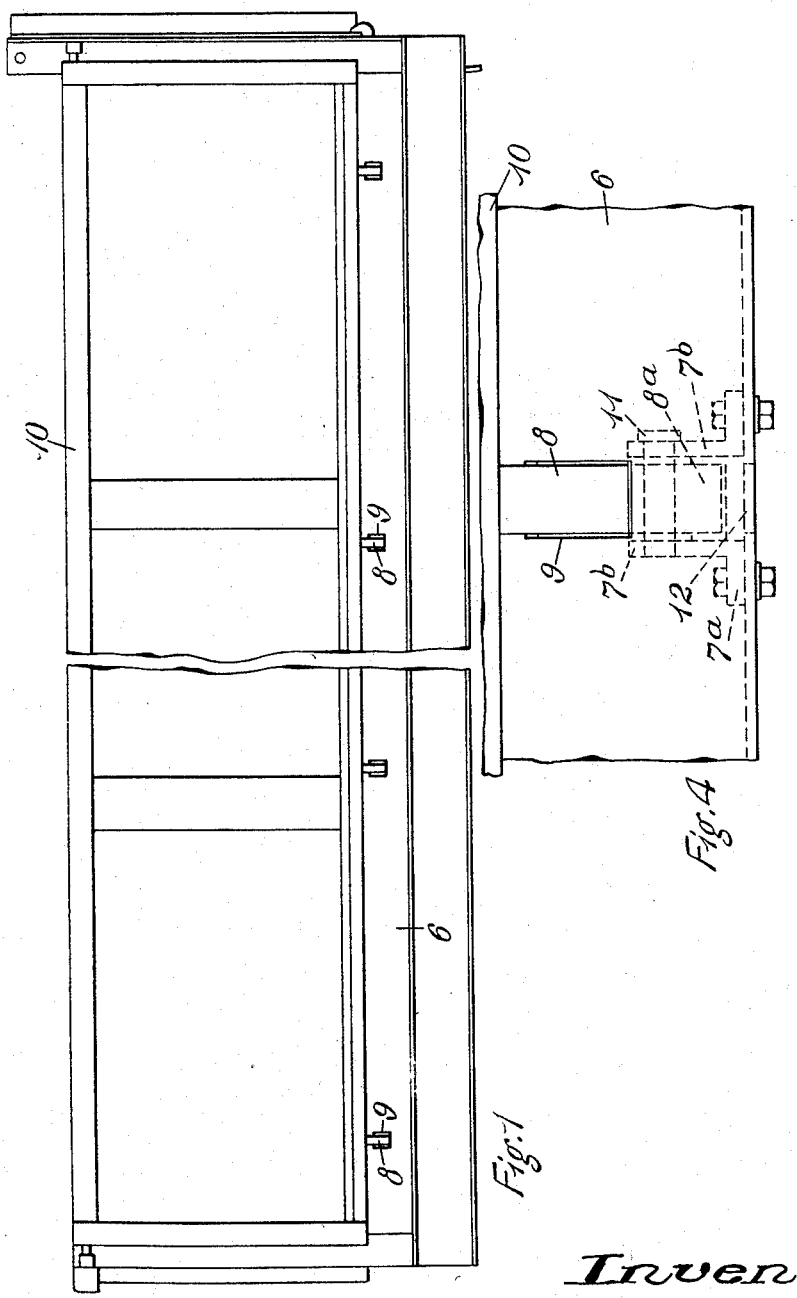

Nov. 1, 1960     W. H. MEATS     2,958,558
GOODS VEHICLE BODIES
Filed June 4, 1959     2 Sheets-Sheet 2
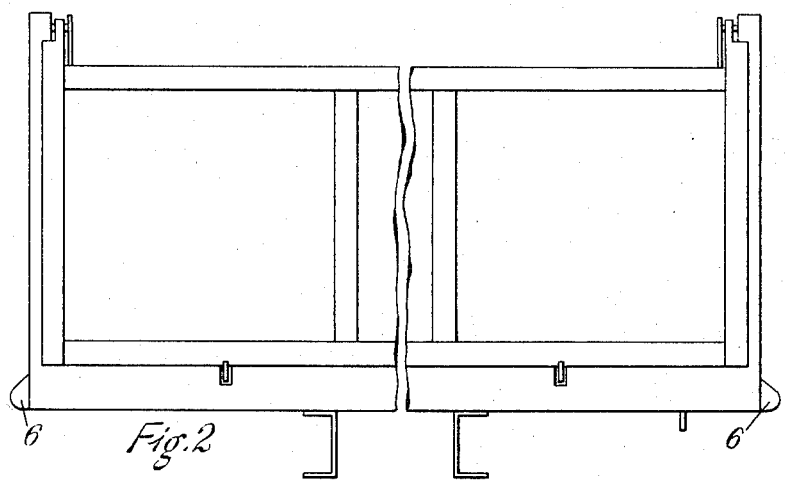
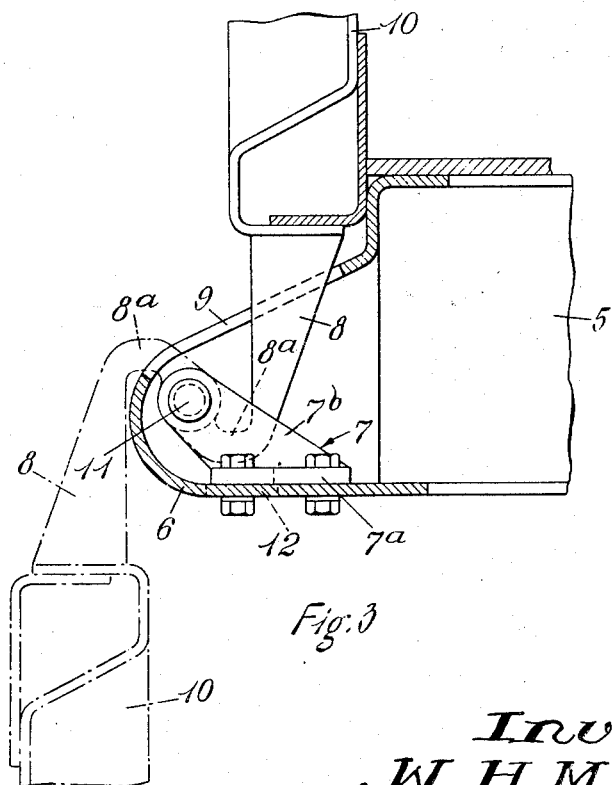
Inventor
W. H. Meats
By Glascock Downing Seebold
Attys.

United States Patent Office 2,958,558
Patented Nov. 1, 1960

2,958,558

GOODS VEHICLE BODIES

William Henry Meats, Cheltenham, England, assignor to Telehoist Limited, Cheltenham, England Filed June 4, 1959, Ser. No. 818,099

Claims priority, application Great Britain June 19, 1958

1 Claim. (Cl. 296—57)

This invention relates to bodies for goods vehicles, more particularly road vehicles, and of the kind incorporating at least one side board which is connected to the floor of the body by hinge parts extending beyond the side edges of the floor.

In such a construction the projecting hinge parts are dangerous to persons or vehicles with which they may be in collision, and the object of the present invention is to provide a convenient means of covering the hinge parts to minimize such danger.

According to the invention in a goods vehicle body of the kind specified the hinge parts attached to the floor of the body are mounted within a housing extending laterally beyond, and at a level below the upper side of the floor, said housing extending throughout the length of the floor and having formed in its upper side gaps through which extend the complementary hinge parts attached to the side board, and in its lower side apertures for the escape of material entering the housing through said gaps.

In the accompanying drawings Figures 1 and 2 are side and rear views respectively of an example of the invention, Figure 3 is a fragmentary sectional view to an enlarged scale, and Figure 4 is a fragmentary side view to the same scale as Figure 3.

In the illustrated example of the invention at each side of the floor 5 of the vehicle body is a housing 6 which extends throughout the length of the floor. This housing is formed from a strip of sheet metal which is bent to hollow form, and has one marginal edge secured to the underside of the floor and its upper marginal edge, which is of cranked form, secured to the side edge and the upper side of the floor. The shape of the housing thus formed is such that it extends beyond the side edge of the floor, and below the upper side of the latter.

In the base of the housing are secured a plurality of spaced hinge parts 7 each of which is engaged with one of a plurality of complementary hinge parts 8 of cranked form extending through one of a plurality of spaced gaps 9 formed in the upper side of the housing, the parts being secured to a side board 10 of the vehicle body. The arrangement is such that when the side board is in the raised position its inner lower edge will bear against the part of the strip which is secured to the side edge of the floor, and when in the lowered position the cranked form of the hinge parts 8 permits the side board to hang vertically in a plane beyond the outer side of the housing as shown in broken lines in Figure 3.

It will be appreciated that there is a tendency for material to enter the housing 6 through the gaps 9, and in order to permit of this material escaping there are formed in the base of the housing a plurality of holes which are situated respectively adjacent the hinge parts. In the illustrated construction, the hinge parts 7 each comprise a base plate $7^a$ carrying a pair of upstanding and spaced ear pieces $7^b$ between which extends a hinge pin 11 connecting this part to the associated part 8. The base plate $7^a$ is cut away to expose a hole 12 in the base of the housing, and the complementary part 8 is so shaped that, when the side board 10 is moved to a raised position the cranked portion $8^a$ of the part 8 will tend to press any material in the housing beneath it through the hole 12.

Having thus described my invention what I claim as new and desire to secure by Letters Patent is:

A goods vehicle body having in combination a floor, at least one side board situated at one side of the floor and movable relative thereto between raised and lowered positions, a housing which is secured to and extends throughout the length of the said side of the floor, and which projects laterally from the latter, the upper side of the housing being situated lower than the upper surface of the floor, and being provided with gaps at different positions throughout its length, and the lower side of the housing being provided with apertures which are separate from and situated beneath the gaps in the upper side to permit the escape of material entering the housing through the said gaps, fixed hinge parts situated within and secured to the lower side of the housing at positions adjacent the apertures therein, complementary hinge parts secured to the side board and extending through the gaps in the upper side of the housing, and hinge pins interconnecting the fixed and complementary hinge parts, the complementary hinge parts having cranked portions which, when the side board is moved to its raised position, tend to force through the apertures in the lower side of the housing any material lodging within the housing beneath the complementary hinge parts, and which, when the side board is in its lowered position, enables it to hang vertically in a plane beyond the outer side of the housing.

References Cited in the file of this patent

UNITED STATES PATENTS

| 1,695,609 | Richter | Dec. 18, 1928 |
| 2,343,810 | Schonitzer | Mar. 7, 1944 |

FOREIGN PATENTS

| 454,886 | Great Britain | Oct. 9, 1936 |